United States Patent
Sullivan et al.

(10) Patent No.: US 10,408,313 B1
(45) Date of Patent: Sep. 10, 2019

(54) SPOOLED TORSION SPRING FOR SECURING HEAD STRAP IN HEAD-MOUNTED DISPLAY

(71) Applicant: Facebook Technologies, LLC, Menlo Park, CA (US)

(72) Inventors: Joseph P. Sullivan, Palo Alto, CA (US); Adam Hewko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 283 days.

(21) Appl. No.: 15/583,651

(22) Filed: May 1, 2017

(51) Int. Cl.
*F16H 19/02* (2006.01)
*G06F 1/16* (2006.01)
*F16H 19/06* (2006.01)

(52) U.S. Cl.
CPC ............. *F16H 19/06* (2013.01); *G06F 1/163* (2013.01)

(58) Field of Classification Search
CPC ...... F16H 19/02; F16H 19/06; F16H 19/0672; F16H 21/02; G06F 1/163; G02B 27/017; G02B 27/0176; F16M 13/00
See application file for complete search history.

(56) References Cited

U.S. PATENT DOCUMENTS

| | | | | |
|---|---|---|---|---|
| 9,557,569 B2* | 1/2017 | Tazbaz | ............... | G02B 27/0179 |
| 9,810,911 B2* | 11/2017 | Miller | .................. | H05K 999/99 |
| 10,095,038 B1* | 10/2018 | Hsu | ....................... | G02B 27/0172 |
| 10,251,289 B2* | 4/2019 | Chen | ..................... | H05K 5/0217 |
| 10,251,292 B2* | 4/2019 | Araki | .................. | H05K 5/0221 |
| 2018/0295733 A1* | 10/2018 | Wen | ..................... | H05K 5/0017 |

* cited by examiner

*Primary Examiner* — Adam D Rogers
(74) *Attorney, Agent, or Firm* — Fenwick & West LLP

(57) ABSTRACT

An apparatus for adjusting a head strap in a head-mounted display (HMD) includes a rigid body, a flexible link, a spool, a torsion spring, a driving gear assembly a rigid shaft, a rod, and a holder. The driving gear assembly includes a first gear and a second gear. The torsion spring applies a biasing torque onto the driving gear assembly. Based on the biasing torque from the torsion spring, the driving gear assembly rotates. The spool rotates relative to the rigid body to wind the flexible link onto the spool. A biasing torque adjustment mechanism may be provided to adjust the biasing torque applied by the torsion spring.

17 Claims, 4 Drawing Sheets

SPOOLED TORSION SPRING FOR SECURING HEAD STRAP IN HEAD-MOUNTED DISPLAY

BACKGROUND

Field of the Disclosure

The present disclosure generally relates to head-mounted displays, and specifically to an apparatus for adjusting and securing the head strap of the head-mounted displays.

Description of the Related Arts

Head-mounted displays (HMDs) have wide applications in various fields, including engineering design, medical surgery practice, military simulated practice, and video gaming. For example, a user wears an HMD while playing video games so that the user can have a more interactive experience in a virtual environment. As opposed to other types of display devices, an HMD is worn directly over a user's head. The HMD may directly interface with a user's face while exerting pressure onto the user's head due to its weight. Hence, a strap system is used in the HMD to secure the HMD to the user's head.

SUMMARY

Embodiments relate to an apparatus for adjusting a head strap of a head-mounted display (HMD). The apparatus includes a flexible link connected to one end of a head strap. A spool is connected to a rigid body in a rotatable manner so that a flexible link can be wound onto or unwind from the spool to move the end of the head strap. The driving gear assembly is connected between another end of the torsion spring and the spool to transmit a biasing torque onto the spool.

In some embodiments, the driving gear assembly transmits the biasing torque of the torsion spring to the spool in a direction of winding the flexible link onto the spool. The driving gear assembly may further include a first gear connected to one end of the torsion spring and rotating about a first axis relative to a rigid body of the HMD and a second gear meshing with the first gear and rotating about a second axis relative to the rigid body.

In some embodiment, another end of the torsion spring is coupled to a biasing torque adjustment mechanism. The biasing torque adjustment mechanism may include a third gear rotating about the second axis relative to the rigid body, a fourth gear meshing with the second gear and rotating about the first axis relative to the rigid body in a fixed position relative to the spool, and a preload shaft connected to another end of the torsion spring and having an end connected to the fourth gear.

In some embodiments, the first axis is parallel to the second axis, and the end of the head strap moves in a direction perpendicular to the first axis if the flexible link winds or unwinds.

In some embodiments, the third gear may have relatively higher number of teeth when compared to the fourth gear. The second gear may have relatively higher number of teeth when compared to the first gear.

In some embodiments, the apparatus includes a holder attached to the rigid body and receiving another end of the preload shaft to rotatably secure the other end of the preload shaft.

BRIEF DESCRIPTION OF THE DRAWINGS

The teachings of the embodiments can be readily understood by considering the following detailed description in conjunction with the accompanying drawings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to an apparatus for securing a head strap to a body of a head-mounted display using a torsion spring to exert a force onto a head of the user. The torsion spring exerts a constant biasing torque onto a driving gear assembly in a pulling direction of a member of the apparatus so that the head strap applies a constant force onto the head regardless of the size of the user's head. The biasing torque may be adjusted by a biasing torque adjusting mechanism that is adjustable by the user.

Figure 1:
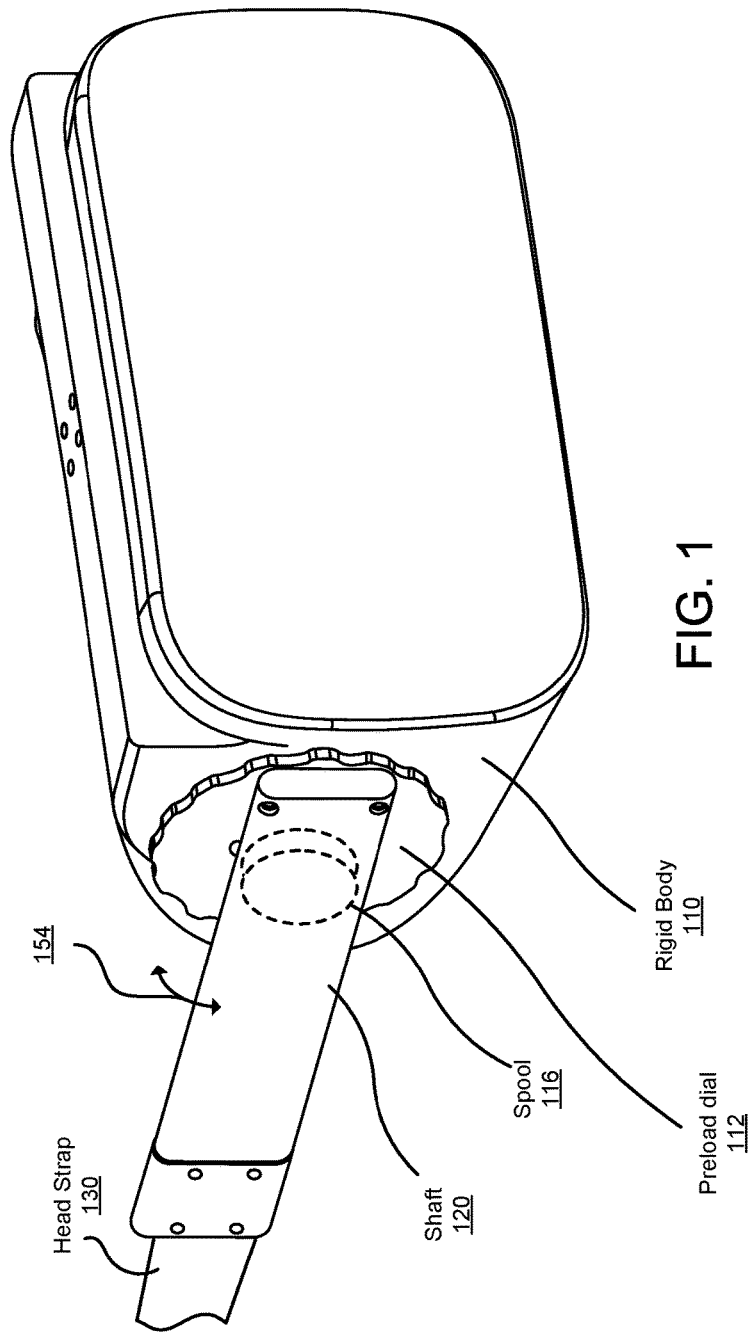
FIG. 1 is a perspective view of a head-mounted display with a head strap, in accordance with one embodiment.

FIG. 1 is a perspective view of a head-mounted display (HMD) with a head strap 130, in accordance with one embodiment. The HMD includes, among other components, a rigid body 110, a preload dial 112, a spool 116, two shafts 120 (only one shaft is shown in FIG. 1) and a head strap 130. The rigid body 110 includes various components such as a display panel, optical elements and circuits (not shown). The details of these components are omitted herein for the sake of brevity.

The shaft 120 is a rigid component that secures the end of the head strap 130 to the rigid body 110. The head strap 130 may be connected to the shaft 120 and the rigid body 110 using various mechanisms such as screw, adhesives or Velcro. In some embodiments, the head strap 130 may be coupled to an end of a flexible link 210, as described below in detail with reference to FIG. 2. In one example, the head strap 130 slides within the shaft 120. In some configurations, the head strap 130 may be connected to the rigid body 110 through the preload dial 112. The head strap 130 moves relative to the rigid body 110 to make space for the user to wear or take off the HMD while pulling the head strap 130 towards rigid body 110 to secure the HMD to the user's head after the user wears the HMD.

The preload dial 112 is a rotatable plate used for adjusting the preload applied to a torsion spring (not shown here). The user may rotate the preload dial 112 to adjust the biasing torque that the torsion spring applies to the spool 116, as described below in detail with reference to FIG. 2.

The spool 116 is a mechanical component performing a rotational movement to wind or unwind the flexible link 210 attached to the head strap 130, as described below in detail with reference to FIG. 2. Because the shaft 120 is fixed to the head strap 130, the head strap 130 moves back and forth in response to the movement of the spool 116. The shaft 120 can also rotate as indicated by an arrow 154 about a first axis 235 (see FIG. 2). By adjusting the head strap 130 relative to the rigid body 110 as well as the tilting angle of the HMD, the user can comfortably wear the HMD. One end of the head strap 130 moves based on a rotation of a cylindrical component by pulling a flexible link 210, as described below in conjunction with FIG. 2.

Figure 2:
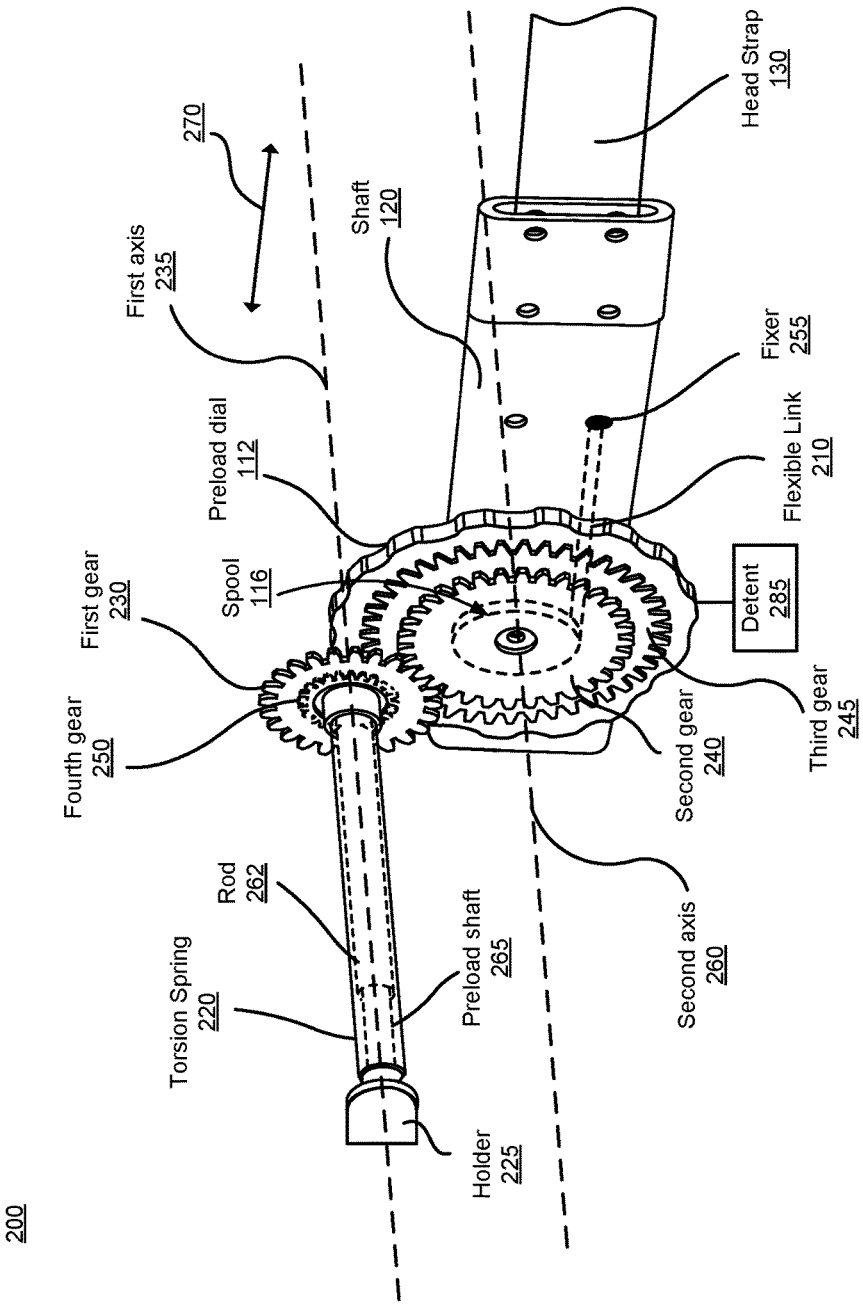
FIG. 2 is a perspective view of an apparatus for securing the head strap of FIG. 1 in the head-mounted display, in accordance with one embodiment.

FIG. 2 is a perspective view of an apparatus 200 for securing the head strap 130 of FIG. 1 to the rigid body 110, in accordance with one embodiment. The securing apparatus 200 may include, among other components, the spool 116, the shaft 120, the head strap 130, a flexible link 210, a torsion spring 220, a holder 225, a first gear 230, a second gear 240, a third gear 245, a fourth gear 250, a fixer 255, a rod 262, a preload shaft 265 and a detent 285. The apparatus 200 may also include components not illustrated in FIG. 2 such as an axle rotatably securing the second gear 240 and the third gear 245 to the rigid body 110.

The flexible link 210 is a connecting component that is connected to the head strap 130 located inside the shaft 120 and wound onto or unwound from the spool 116. In some configurations, the flexible link 210 may be a string that can be flexed for winding onto or unwinding from the spool 116. The flexible link 210 may be made of flexible materials such as rubber or fiber. In the embodiment of FIG. 2, one end of the flexible link 210 is secured to the head strap 130 by a fixer 255 that may be hook or screw fixed to the shaft 120. Although only a single flexible link 210 is illustrated in FIG. 2, two or more flexible link may be fixed to the head strap 130 and wound or unwound from the spool 116 or another component.

The spool 116 is a mechanical component onto which the flexible link 210 can be wound. The spool 116 converts the rotational torque received via a driving gear assembly into a linear force applied to the shaft 120, and vice versa. The spool 116 may include a rim at each end so that the flexible link 210 is properly wound onto the spool 116. The spool 116 may be made of, among other things, plastic, fiber, metal, or some combination thereof. In the embodiment of FIG. 2, the spool 116 is embedded in the shaft 120. In some embodiments, the spool 116 may be positioned coaxially with some gears of the driving gear assembly.

The torsion spring 220 stores mechanical energy when it is twisted. The torsion spring 220 can be of a compact configuration and can produce a relatively constant level of biasing torque even when twisted by different angles. In some configurations, the torsion spring 220 includes a torsion bar that is subjected to twisting about an axis based on a torque applied at the two ends of the torsion spring 220.

One end of the torsion spring 220 is attached to a portion of the preload shaft 265 close to the holder 225 and the other end of the torsion spring 220 is attached directly to the first gear 230 directly or indirectly to rotate with the fourth gear 250. The end of the preload shaft 265 is rotatably received by the holder 225 attached to the rigid body 110. The rotation angle of both ends of the torsion spring 220 is set to rotate the driving gear assembly so that the flexible link 210 is pulled to wind onto the spool 116 absent an external force applied to the head strap 130.

The rod 262 is hollow and receives a part of the preload shaft 265 while the rod 262 is placed within the hollow portion of the torsion spring 220. The rod 262 prevents the torsion spring 220 from twisting in a direction deviating from the first axis 235 and also prevents the torsion spring 220 from coming into contact with the preload shaft 265. The torsion spring 220, the rod 262, and the preload shaft 265 may extend along a first axis 235. The rod 262 extends along the first axis 235 with the other end of the torsion spring 220 secured to the driving gear assembly.

The holder 225 is a mechanical element that fixes an end of preload shaft 265 onto the rigid body 110. The fixing structure that fixes the holder 225 to the rigid body 110 is omitted from FIG. 2 for the sake of brevity.

The first gear 230 and the second gear 240 form the driving gear assembly. The driving gear assembly conveys the torque of the torsion spring 220 to the spool 116 as well as conveying an external torque (e.g., applied to the spool 116 by pulling of the head strap 130 away from the rigid body 110) to the torsion spring 220. Components of the driving gear assembly rotates along one or more axes based on the biasing torque applied by the torsion spring 220. In other embodiments, different number of gears or different types of gears may be used in the driving gear assembly.

In the embodiment of FIG. 2, an end of the flexible link 210 is connected to the head strap 130. The spool 116 rotates relative to the rigid body 110 so that the flexible link 210 can be wound or unwound to move the head strap 130, and thus, move the end of the head strap 130 connected to the shaft 120.

The first gear 230 is connected to an end of the torsion spring 220, and rotates relative to the first axis 235. The first gear 230 and the second gear 240 of the driving gear assembly transmit a biasing torque of the torsion spring 220 to the spool 116 in a direction of winding the flexible link 210 onto the spool 116.

The second gear 240 meshes with the first gear 230 and rotates about a second axis 260. The second gear 240 is attached to the spool 116 that drives the head strap 130. The fourth gear 250 meshes with the third gear 245 and rotates about the first axis 235. The first gear 230 and the fourth gear 250 rotate about the same first axis 235, but these gears are not fixed to each other so that the first gear 230 and the fourth gear 250 can rotate relative to each other.

In one embodiment, the first gear 230 has fewer teeth than the second gear 240, the third gear 245 has more teeth than the second gear 240. The gear ratios of the gears in the driving gear assembly may be set to apply desired retracting force onto the shaft 120 by the biasing torque of the torsion spring 220.

A biasing torque adjustment mechanism includes the preload dial 112, the third gear 245, the fourth gear 250, the preload shaft 265 and the detent 285. The preload shaft 265 is connected to one end of the torsion spring 220 which is driven by the preload dial 112. The preload dial 112 is connected to the third gear 245 to rotate with the third gear 245. The third gear 245 rotates about the second axis 260 but is not fixed to the third gear 245, and hence, the third gear 245 rotates independently of the second gear 240.

The fourth gear 250 meshes with the third gear 245. The fourth gear 250 rotates about the first axis 235 but is not connected to the first gear 230, and hence, the fourth gear 250 rotates independently of the first gear 230. As the preload dial 112 is rotated, the third gear 245 rotates with the preload dial 112, causing the fourth gear 250 meshing with the third gear 245 to rotate. The first gear 230 rotates about the same axis 235 in response to the rotation of the fourth gear 250. The first gear 230 drives the second gear 240, thereby adjusting the biasing torque that the torsion spring 220 applies to the spool 116.

The detent 285 is operable to prevent or enable rotation of the biasing torque adjustment mechanism. In one embodiment, the detent 285 engages the preload dial 112 to prevent its location or disengages from the preload dial 112 to enable rotation of the preload dial 112. In other embodiments, the detent 285 may engage or disengage the third gear 245, the fourth gear 250 or the preload shaft 265 to enable adjustment of the biasing torque or lock the biasing torque. When engaged, the biasing torque adjustment mechanism is fixed to the rigid body 110 and locked.

In some configurations, the first axis 235 is parallel to the second axis 260 and one end of the head strap 130 moves in a direction 270 that is perpendicular to the first axis 235 and the second axis 260.

Figure 3:
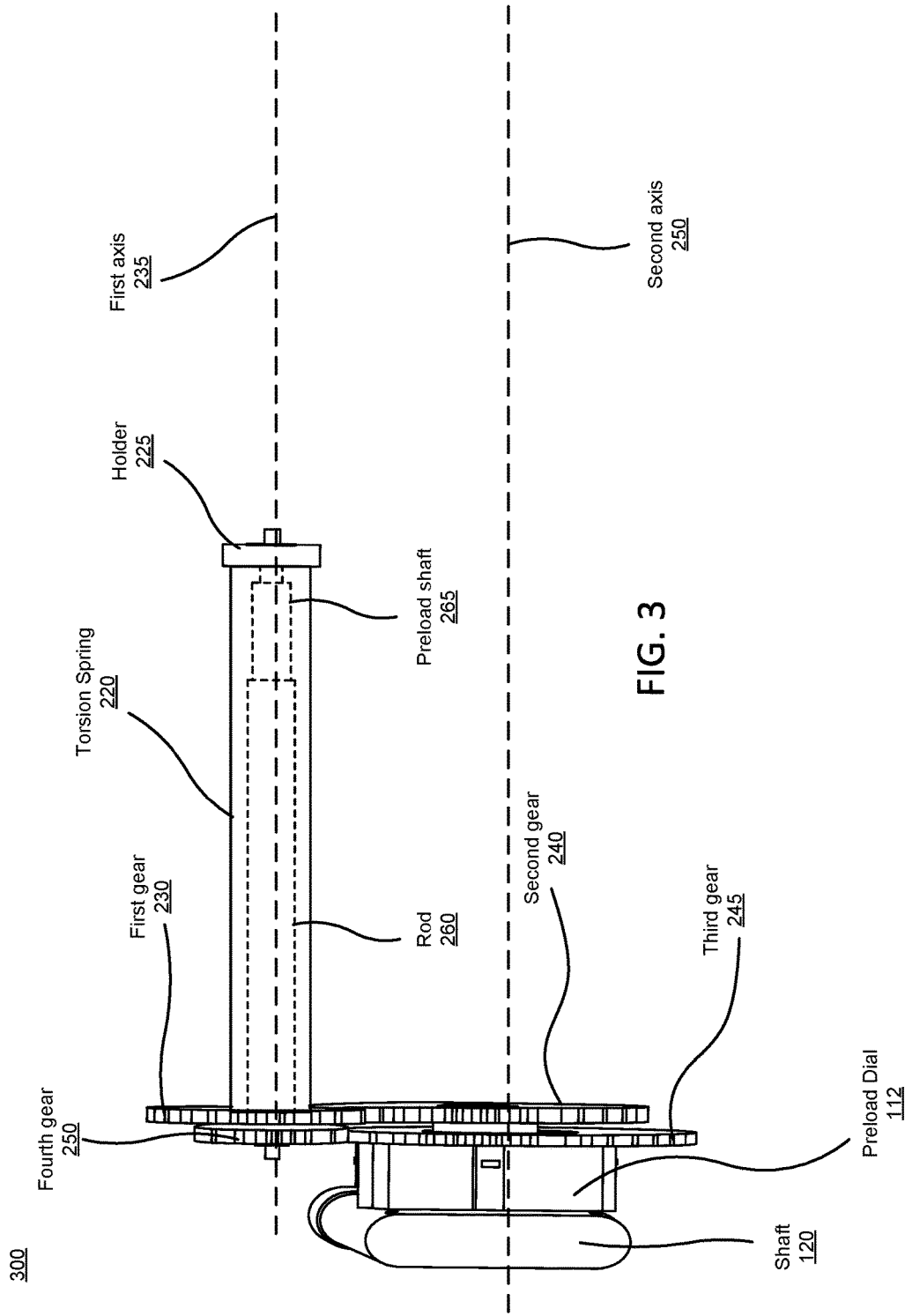
FIG. 3 is side view of the apparatus for securing the head strap in the head-mounted display, in accordance with one embodiment.

FIG. 3 is a side view the apparatus 200 for securing the head strap 130 to the rigid body 110 of the head-mounted display, in accordance with one embodiment. In the example of FIG. 3, the second gear 240 is fixed to the spool 116 (not shown here), and the third gear 245 is fixed to the preload dial 112. Turning the preload dial 112 rotates the third gear 245 which in turn rotates the fourth gear 250. The preload shaft 265 is driven by the fourth gear 250 to adjust the preload on one end of the torsion spring 220 connected to the holder 225. The torsion spring 220 drives the first gear 230 which in turn drives the second gear 240 attached to the spool 116 driving the head strap 130 as described above with reference to FIG. 1.

Figure 4:
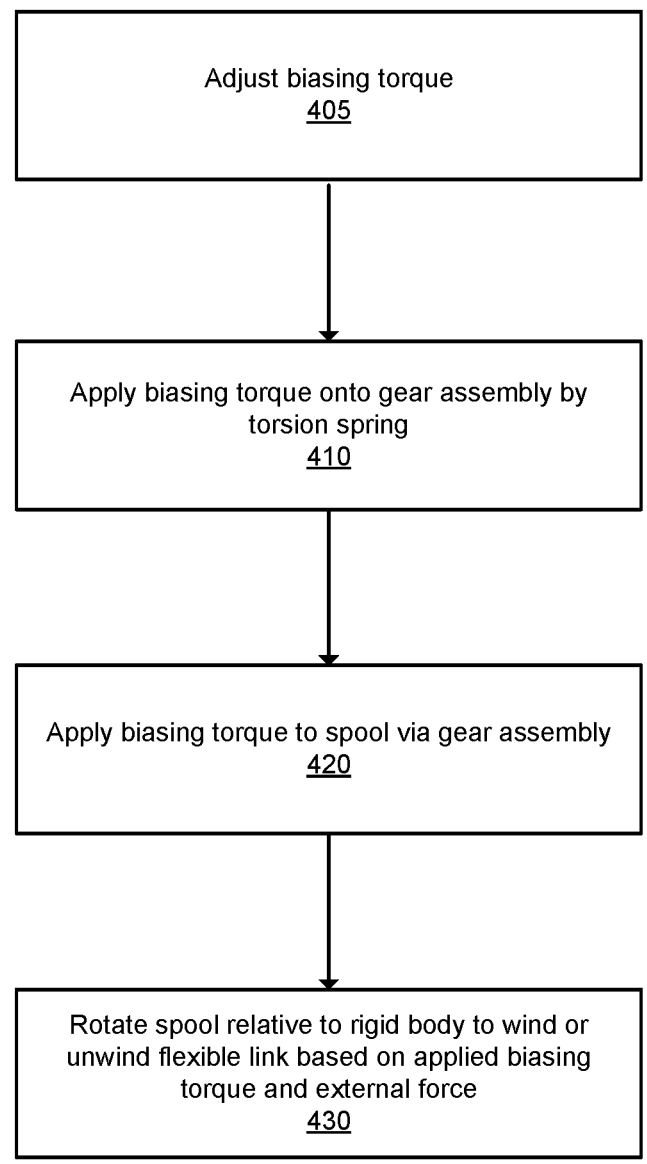
FIG. 4 is a flowchart illustrating a method for operating the head strap of the head-mounted display, in accordance with one embodiment.

FIG. 4 is a flowchart illustrating a method for adjusting the head strap 130 of the head-mounted display, in accordance with one embodiment. The biasing torque to be applied by the torsion spring 220 is adjusted 405 by rotating the preload dial 112.

The torsion spring 220 applies 410 a biasing torque onto the driving gear assembly, as described above in conjunction with FIG. 2. In some configurations, one end of the torsion spring 220 is secured the biasing torque adjustment mechanism and another end of the torsion spring 220 is secured to the driving gear assembly. The torsion spring 220 applies 410 the biasing torque by rotating the driving gear assembly.

The biasing torque from the torsion spring 220 is applied to the spool 116 via the driving gear assembly. As described above in conjunction with FIG. 2, the first gear 230 connected to an end of the torsion spring 220 receives the biasing torque from the torsion spring 220 and transmits the biasing torque to the spool 116 via the second gear 240, third gear 245 and fourth gear 250.

The spool 116 is rotated 430 relative to the rigid body 110 to wind or unwind the flexible link 210 onto the spool 116 based on the applied biasing torque and an external force, as described above in conjunction with FIG. 2. If the biasing torque applied to the spool 116 is greater than an external torque resulting from the external force applied by the pulling of the flexible link 210 (e.g., when the user pulls the head strap 130), the flexible link 210 is unwound from the spool 116. Conversely, if the external torque is absent or small relative to the biasing torque, the flexible link 210 is wound onto the spool 116.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. An apparatus for adjusting a head strap of a head-mounted display (HMD) comprising:
   a rigid body;
   a flexible link coupled to an end of the head strap;
   a spool coupled to the rigid body in a rotatable manner to wind or unwind the flexible link to move the end of the head strap;
   a torsion spring; and
   a driving gear assembly coupled between an end of the torsion spring and the spool, the driving gear assembly configured to transmit a biasing torque of the torsion spring to the spool in a direction of winding the flexible link onto the spool.

2. The apparatus of claim 1, wherein the driving gear assembly comprises:
   a first gear connected to the end of the torsion spring and rotating about a first axis; and
   a second gear meshing with the first gear and rotating about a second axis, the second gear fixed to the spool.

3. The apparatus of claim 2, wherein another end of the torsion spring is coupled to a biasing torque adjustment mechanism.

4. The apparatus of claim 3, wherein the biasing torque adjustment mechanism comprises:
   a third gear rotating about the second axis;
   a fourth gear meshing with the second gear and rotating about the first axis; and
   a preload shaft connected to the other end of the torsion spring and having an end connected to the fourth gear.

5. The apparatus of claim 4, wherein a total number of teeth of the first gear is fewer than a total number of teeth of the second gear, a total number of teeth of the second gear fewer than a total number of teeth of the third gear, and a total number of teeth of the third gear more than a total number of teeth of the fourth gear.

6. The apparatus of claim 4, further comprising:
   a holder attached to the rigid body and receiving another end of the preload shaft.

7. The apparatus of claim 4, further comprising a rod receiving at least a portion of the preload shaft and extending along the first axis.

8. The apparatus of claim 2, wherein the first axis and the second axis are parallel.

9. The apparatus of claim 1, further comprising a rigid shaft securing the end of the head strap, an end of the flexible link secured to the rigid shaft and another end of the flexible link secured to the spool.

10. A method for adjusting a head strap of a head-mounted display (HMD) comprising:
    applying a biasing torque onto a driving gear assembly by a torsion spring having one end secured to the driving gear assembly;
    applying the biasing torque to a spool via the driving gear assembly;
    rotating the spool relative to a rigid body based on the biasing torque and an external force to wind a flexible link onto the spool or unwind the flexible link from the spool; and
    moving the head strap according to winding or unwinding of the flexible link.

11. The method of claim 10, wherein the flexible link is wound onto the spool responsive to the biasing torque being greater than an external torque applied to the spool caused by the external force; and wherein the flexible link is wound from the spool responsive to the biasing torque being smaller than the external torque.

12. The method of claim 10, further comprising:
rotating a first gear connected to the end of the torsion spring and rotating about a first axis relative to the rigid body; and
rotating a second gear meshing with the first gear about a second axis relative to the rigid body, the second gear fixed to the spool.

13. The method of claim 12, further comprising:
adjusting the biasing torque by rotating another end of the torsion spring.

14. The method of claim 13, wherein adjusting the biasing torque comprises:
rotating a third gear fixed to the second gear about the second axis relative to the rigid body;
rotating a fourth gear meshing with the second gear about the first axis relative to the rigid body; and
rotating a preload shaft connected to the other end of the torsion spring and having an end connected to the fourth gear.

15. The method of claim 14, wherein a total number of teeth of the first gear is fewer than a total number of teeth of the second gear, a total number of teeth of the second gear fewer than a total number of teeth of the third gear, and a total number of teeth of the third gear more than a total number of teeth of the fourth gear.

16. The method of claim 12, wherein the first axis and the second axis are parallel.

17. The method of claim 16, wherein an end of the head strap moves in a direction perpendicular to the first axis and the second axis responsive to winding or unwinding of the flexible link.

* * * * *